Figure 1:
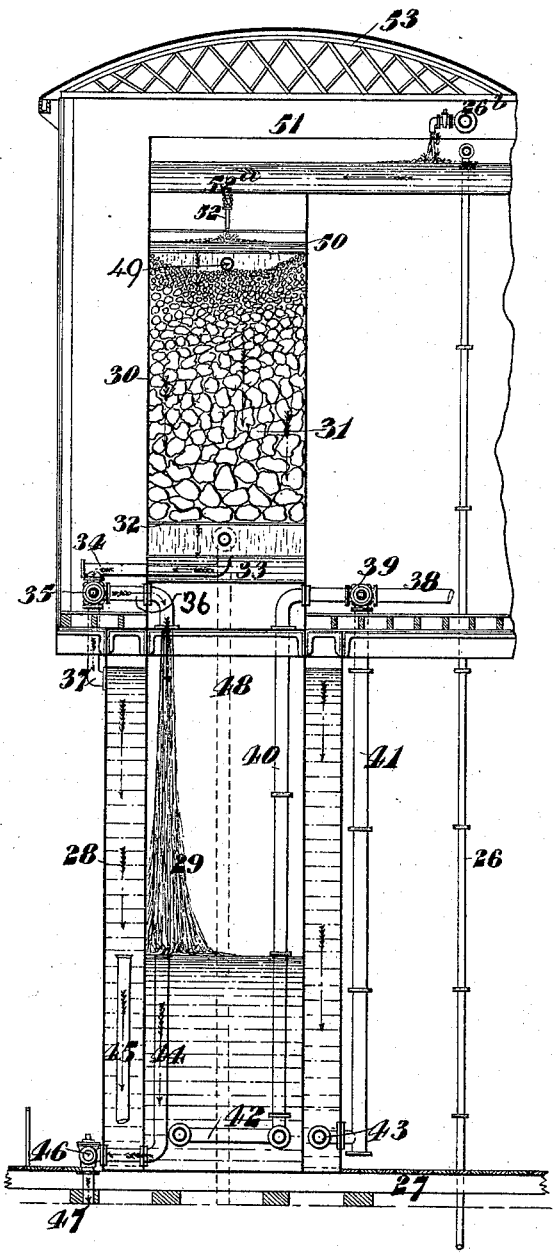

(No Model.) 2 Sheets—Sheet 1.

G. BELL.
APPARATUS FOR MAKING SODIUM BICARBONATE.

No. 470,635. Patented Mar. 8, 1892.

Witnesses.
E. C. Duffy
H. E. Peck

Inventor
Geo Bell
per O. E. Duffy
atty

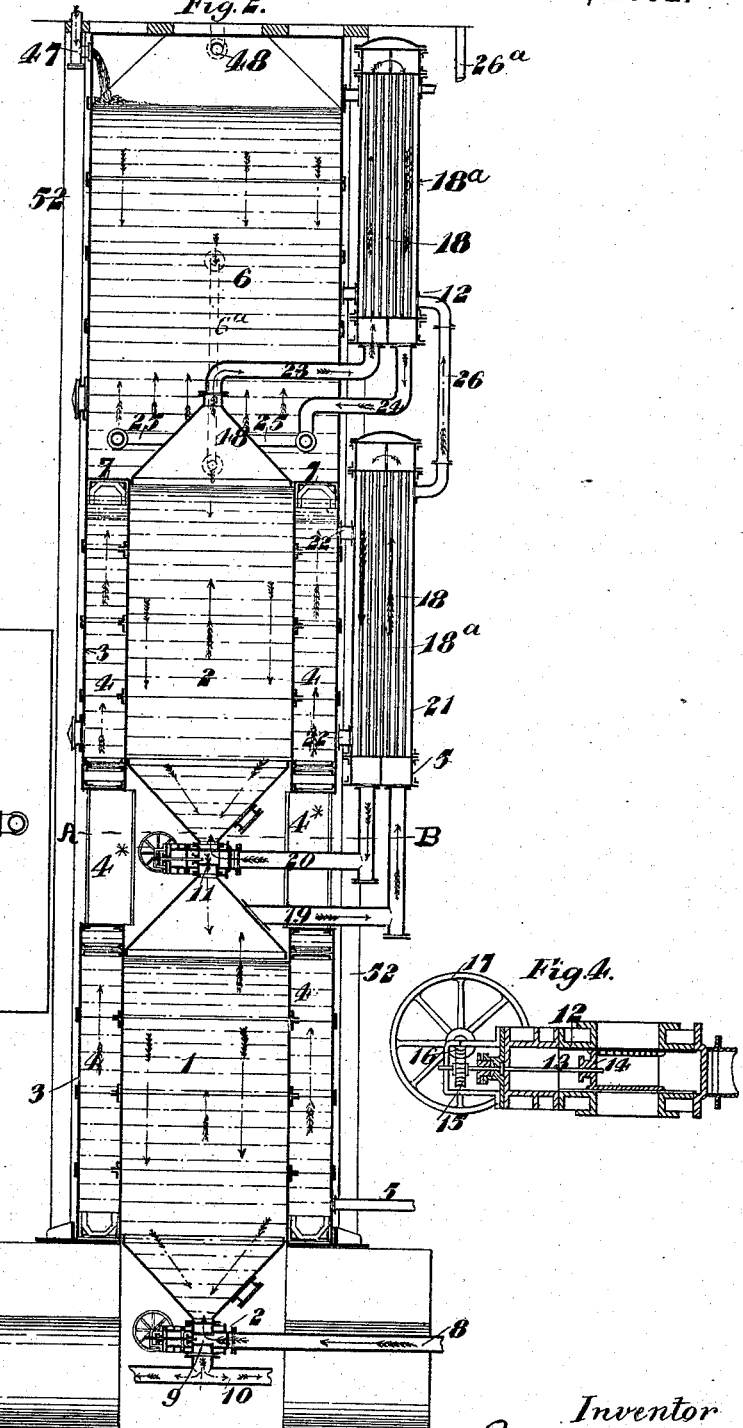

UNITED STATES PATENT OFFICE.

GEORGE BELL, OF SANDOWN LANE, WAVERTREE, ASSIGNOR TO GEORGE BELL, OF SAME PLACE, AND JOHN VIVIAN, OF GODWELL, ENGLAND.

APPARATUS FOR MAKING SODIUM BICARBONATE.

SPECIFICATION forming part of Letters Patent No. 470,635, dated March 8, 1892.

Application filed March 13, 1891. Serial No. 384,982. (No model.)

*To all whom it may concern:*

Be it known that I, GEORGE BELL, a subject of the Queen of Great Britain and Ireland, residing at Sandown Lane, Wavertree, in the county of Lancaster, England, have invented Improvements in Apparatus for Use in the Manufacture of Bicarbonate of Soda by the Ammonia-Soda Process, of which the following is a specification.

This invention has reference to apparatus for use in the manufacture of bicarbonate of soda by the process generally known as the "ammonia-soda process." The apparatus comprises two or more vessels hereinafter called "carbonators," arranged one above another, and each provided with a perforated valve adapted to act as a gas and blow-off cock, said carbonators having formed around them a jacket or jackets within which brine on its upward course preparatory to its treatment in the carbonators is caused to circulate for the purpose of cooling the contents of the said carbonators and of receiving any ammonia that may leak therefrom. Between the two carbonators, or, it may be, between each pair of adjacent carbonators, if more than two are used, is a cooling apparatus in which carbonic acid is cooled as it flows through one carbonator to another. An arrangement of apparatus according to this invention with three carbonators is shown in the accompanying drawings, in which—

Figure 1 is a vertical section of the upper portion of the apparatus, and Fig. 2 is a vertical section of the lower portion, these two portions when in use being arranged one above the other; but they are shown separate in order that they may be drawn to such a scale that the construction will be clearly known. Fig. 3 is a horizontal section on the line A B of Fig. 2. Fig. 4 is a sectional elevation, on a larger scale, of one of the perforated valves.

1 and 2 are carbonators of cylindrical form, each having conical ends and arranged one above the other within a cylindrical casing 3, that forms an annular space or jacket 4, surrounding said carbonators, and through which brine is caused to flow, as hereinafter described, from a supply-pipe 5.

6 is a third carbonator of cylindrical form, closed at the top and arranged above the other two carbonators and the jacket surrounding them. This carbonator is formed by an annular plate 7, the top of the carbonator 2, and the upward extension of the casing 3.

$6^a$ is an external pipe for connecting carbonators 2 and 6 when necessary.

To the lower end of the carbonator 1 is connected a carbonic-acid-gas supply-pipe 8 and a valve 9, that is adapted, when moved laterally, to serve as a blow-off valve to discharge the contents of the carbonator 1 into a pipe 10. Between the two carbonators 1 and 2 is a similar valve 11. These valves 9 and 11, which are of rectangular form in cross-section, are each made hollow, as shown more clearly in Fig. 4, being open at one end for the admission of carbonic-acid gas and closed at the other end and perforated at the top for the escape of the gas into the carbonator above. Each valve is arranged to slide in a casing 12, and is moved laterally by a screw-spindle 13, adapted to rotate, but not to move endwise, and which at one end works in a screw-threaded boss 14 on the valve and at the other end projects through the stuffing-box and carries a worm-wheel 15, by which it can be rotated to move the valve into its open and closed positions by the worm 16 and hand-wheel 17. The spindle of each valve may be connected to the piston of the hydraulic cylinder, so that the valve can be opened and closed by hydraulic pressure in a manner that will be readily understood.

$4^\times$ $4^\times$ are openings through the casing 3 and the casing forming the walls of the carbonators 1 and 2. One of these openings serves for gaining access to the hand-wheel 17 for operating the valve 11, and the other enables the pipes 19 and 20, hereinafter mentioned, to be readily connected to the carbonators 1 and 2, respectively.

Between the carbonators 1 and 2 is a cooling apparatus, consisting of the two series of vertical pipes 18 and 18ª, that are in communication at the top. One series 18 is in communication by a pipe 19 with the upper end of the carbonator 1 and the other series 18ª is in communication by the pipe 20 with the interior of the hollow valve 11. These pipes 18 and 18ª are arranged within casing 21 in communication with the jacket 4 by branch pipes 22. Between the carbonators 2 and 6 is a similar cooling apparatus, connected at one end by the pipe 23 with the top of the carbonator 2 and at the other end by the pipe 24 with the perforated pipe 25, located near the lower end of the carbonator 6.

26 is a pipe that places the interior of the casings 21 in communication with each other, and 26ª is a pipe for leading brine from the upper casing 21 to the brine-tank at the top of the apparatus.

Above the carbonator 6 and supported by suitable framing 27 is a saturator, comprising an outer cylindrical casing 28 and an inner cylindrical vessel 29. Above the saturator is a tower 30, charged with coke 31, that rests upon a perforated support 32, below which is the tray 33.

34 is an outlet-pipe, with valve 35 and branches 36 and 37 for placing the lower end of the tower in communication with the inner and outer upper parts of the saturator.

38 is an ammonia-gas supply-pipe provided with valve 39 and branch pipes 40 and 41 in communication with perforated pipes 42 and 43, respectively, located in the inner and outer lower parts of the saturator.

44 and 45 are pipes, 46 a valve, and 47 another pipe for conveying liquor from the saturator to the carbonator 6.

48 is an external pipe connecting the upper part of the carbonator 6 with the lower portion of the tower 30 at a point above the tray 33.

49 is a gas-outlet near the top of the tower.

50 is a tray having perforated bottom arranged above the coke in the tower.

Above the tower is a brine-cistern 51, with outlet-pipe 52 above the tray 50.

The apparatus herein described is supported by suitable frame-work 52 and is covered by a roof 53.

The operation of the apparatus is as follows: The carbonators 1, 2, and 6 are charged from the saturator with brine saturated with ammonia-gas. Carbonic-acid gas from an engine is then forced through the pipe 8 and valve 9 and into the carbonator 3, rising from the liquor therein. The carbonic-acid gas arriving in the upper end of this carbonator flows through pipe 19 into the lower cooling apparatus, passing upward through the tubes 18 and down through 18ª. It then flows through pipe 20 and perforated valve 11 into the carbonator 2, rises through the liquor therein to the top of the carbonator 2, whence it passes through pipe 23 into the upper cooling apparatus, flowing through tubes 18 18ª thereof and the pipe 24 to the perforated pipe 25, by which it is distributed through the liquor in the carbonator 6. The gas not absorbed in this carbonator passes through pipe 48 into the tower 30, through which it rises, meeting the descending brine, which absorbs any ammonia that may be present in the escaping gas. The gas not absorbed escapes by the outlet 49 and is further dealt with if necessary. While carbonic acid is passing through the carbonators in the direction of the arrows (shown in full lines) and converting the saturated brine therein into bicarbonate of soda brine is forced by the engine through the pipe 5 into the annular space 4 between the carbonators 1 and 2 and the casing 3. The brine circulates upward through the said space and cools the contents of the carbonators. The brine flows through the two branches 22 into the casing 21 of the lower cooler and through pipe 26 into the casing of the upper one, whence it passes by pipe 26ª to the brine-cistern 51, through the cock 26ᵇ. From this cistern brine descends through the stop-cock 52ª, pipe 52, into the upper tray 50, percolates through the coke 31 in the tower 30, and into the tray 33. It then passes through the pipe 34 and cock 35 into the inner or outer portions of the saturator by the pipe 36 or 37, or into both portions, as may be desired, where it is treated with ammonia-gas supplied from any suitable still. The ammonia enters the saturator through pipe 38, cock 39, and pipes 40 and 42 or pipes 41 and 43, or through all of these pipes, as may be desired. When the brine is sufficiently saturated with ammonia-gas, it is run through pipes 44 and 45, cock 46, and pipe 47 into the carbonator 6. After a suitable interval it is allowed to pass by pipe 6ª into carbonator 2, and after a further interval it is allowed to pass by opening valve 11 from carbonator 2 into carbonator 1, wherein its conversion into bicarbonate of soda by the action of the carbonic-acid gas is completed. The valve 9 is then opened and the bicarbonate of soda and the liquor with which it is mixed are allowed to pass into the pipe 10 and thence to the filter to be further dealt with in the ordinary manner. The dotted arrows indicate the upward and downward course of the brine through the apparatus. By utilizing the brine in its upward course through the space or jacket 4 preparatory to its treatment in the carbonators 1 and 2 for cooling their contents the power ordinarily required to pump up water, especially for this purpose, is saved. The cooling action of the brine, aided by that of the coolers between the adjacent pairs of carbonators, which prevents the carbonic acid carrying heat from one carbonator to another, serves to keep the contents cool and thereby to increase the yield of bicarbonate of soda.

What I claim is—

1. In an apparatus for the manufacture of bicarbonate of soda by the ammonia-soda process, two carbonators arranged one above another and each provided at its lower end with a hollow valve perforated at its upper sides and adapted to act alternately as a gas and blow-off cock, and a gas-supply pipe, in combination with the interior of the lower of said valves, and a pipe arranged to place the upper end of the lower of said carbonators in communication with the interior of the upper of said valves, substantially as herein described, for the purpose set forth.

2. In apparatus for the manufacture of bicarbonate of soda by the ammonia-soda process, the combination of the carbonators having inlets and outlets for liquor and for gas, and the surrounding casing provided with inlet and outlet branches and forming with said carbonators a jacket that is not in communication with the interior of said carbonators through which the brine can be caused to flow preparatory to its treatment in said carbonator, substantially as herein described, for the purpose specified.

3. In apparatus for the manufacture of bicarbonate of soda by the ammonia-soda process, the combination of two carbonators arranged one above another, and the gas-cooling apparatus arranged externally to and in communication with said carbonators and formed with a conduit for cooling-fluid, substantially as specified.

4. In apparatus for the manufacture of bicarbonate of soda by the ammonia-soda process, the combination of two carbonators arranged one above another, a casing arranged to form a jacket to said carbonators and having an inlet and outlet for brine, and a gas-cooling apparatus comprising tubes in communication with each of said carbonators and a casing in communication with said jacket, substantially as herein described, for the purpose specified.

5. In apparatus for the manufacture of bicarbonate of soda by the ammonia-soda process, the combination of two carbonators arranged one above another, a connecting pipe or neck with perforated gas and blow-off cock between them, and a gas-cooling apparatus arranged externally to said carbonators, said cooler having its gas-inlet in communication with the top of the lower carbonator and its gas-outlet in communication with the upper carbonator through said cock, substantially as herein described.

6. In apparatus for the manufacture of bicarbonate of soda by the ammonia-soda process, the combination of two carbonators arranged one above another, and each having at its lower end a perforated gas and blow-off cock, a casing provided with inlet and outlet branches for brine and arranged to form a jacket to said carbonators, a third carbonator arranged above the other two and provided with an inlet for saturated brine and an outlet for gas, and gas-cooling apparatus arranged externally to and between each adjacent pair of carbonators and formed with conduits for cooling-fluid, said conduits from the cooling apparatus being in communication with each other and with said jacket, substantially as herein described, for the purposes specified.

7. In apparatus for the manufacture of bicarbonate of soda by the ammonia-soda process, the combination of the carbonators and a saturator and a coke-tower, these being arranged one above another, pipes for conveying brine downward from said tower to said saturator and saturated brine from said saturator to said carbonator, and pipes for conveying gas upward from said carbonator to said tower, substantially as described.

8. In apparatus for the manufacture of bicarbonate of soda by the ammonia-soda process, the combination of carbonators, a saturator, a coke-tower, and a brine-supply tank arranged one above another, pipe connections with valves for the passage of brine from said tank to said tower and from said tower to said saturator and of saturated brine from said saturator to said carbonators, and pipe connections for the passage of gas from said carbonator to the tower part of said tower, substantially as herein described.

9. In apparatus for the manufacture of bicarbonate of soda by the ammonia-soda process, the combination of two or more carbonators, a gas-cooling apparatus arranged between adjacent carbonators, a jacket surrounding one or more of said carbonators, a saturator with inlets for brine and ammonia-gas and the outlet for saturated brine, a coke-tower, a brine-tank above said coke-tower, and a pipe connection whereby brine circulating through said jacket can pass through each cooling apparatus and thence to said brine-tank, said carbonators, saturators, coke-tower, and brine-receptacle being arranged one above another and adapted to be placed in communication with each other, substantially as described.

10. In apparatus for the manufacture of bicarbonate of soda by the ammonia-soda process, the combination of the carbonators with perforated gas and blow-off cock 9, gas-supply 8, and exit-pipe 10 at the lower end, carbonator 2 and connecting pipe or neck with perforated gas and blow-off cock between said carbonators, a casing 3 surrounding said carbonators and provided with inlet and outlet branches 5 and 22, a tubular cooling apparatus comprising pipes 18 and 18ª, in communication with said carbonators, and a casing in communication with said jacket, substantially as herein described.

11. In apparatus for the manufacture of bicarbonate of soda by the ammonia-soda process, the combination, with one or more carbonators, of the saturator formed with outer and inner casings 28 and 29, coke-tower with inlets and outlets for gas and an outlet for brine, a brine-tank 51, located above said coke-tower and provided with an outlet-pipe 52, pipes 34, 36, and 37, with cock 35, connecting said coke-tower with said saturator, outlet-pipes 44, 45, and 47, with cock 46, connecting said saturator with one of said carbonators, and ammonia-gas-supply pipes 38, 40, 41, 42, and 43, terminating at the lower part of said saturator, substantially as herein described.

In testimony whereof I have signed my name to this specification in the presence of two subscribing witnesses.

GEORGE BELL.

Witnesses:
   ARTHUR L. WALKER,
      *Solicitor, Runcorn.*
   JAMES H. SOMERVILLE,
      *His Clerk, Runcorn.*